3,560,191
NORMALLY LIQUID MIXTURES OF ELEMENTAL PHOSPHORUS AND SULFUR AS PLANT NUTRIENTS
Gustave K. Kohn, Berkeley, and Robert E. Warnock, Concord, Calif., assignors to Chevron Research Company, San Francisco, Calif.
No Drawing. Filed Nov. 22, 1968, Ser. No. 778,311
Int. Cl. C05b 17/00
U.S. Cl. 71—32          5 Claims

ABSTRACT OF THE DISCLOSURE

Soil is fertilized with sulfur and phosphorus by applying normally liquid mixtures of elemental white phosphorus and elemental sulfur at a depth of about 1 to 10 inches and at a rate of about 5 to 120 pounds per acre.

FIELD OF INVENTION

This invention concerns a method for fertilizing soil with elemental white phosphorus and elemental sulfur. More particularly, it involves fertilizing soil with normally liquid mixtures of white phosphorus and sulfur. As used herein "white phosphorus" and "yellow phosphorus" refer to the same material.

BACKGROUND OF INVENTION

Phosphorus fertilization is usually effected by applying a water-soluble form of phosphorus, such as a phosphate, to the soil. The literature shows that red phosphorus has been tried as a fertilizer but that it was, in general, ineffective. Others have reported that when phosphorus sulfides are applied to soil, the phosphorus therein is not readily available to plants.

Sulfur fertilizing is presently done by applying sulfur, sulfides or sulfates to the soil. Whereas the sulfates are immediately available to plant roots; sulfur and sulfides require chemical or microbiological oxidation to sulfates before the sulfur becomes available to the plants.

INVENTION DESCRIPTION

This invention is based on the discovery that normally liquid mixtures of phosphorus and sulfur applied to soil quickly provide substantial quantities of phosphorus and sulfur in forms which are available to plants growing in the soil.

In accordance with this discovery normally liquid mixtures of white phosphorus and sulfur are applied directly to soil at a depth of about 1 to 10 inches, preferably 4 to 8 inches. The quantity of mixture applied will normally range between about 5 and 120 lbs. per acre. Preferably the mixture is deposited in the immediate area in which the crop is to be planted. In this manner the phosphorus and sulfur are readily available to the plants. Thus, if seeds or seedlings are to be planted in rows, the mixture may be deposited as a continuous stream adjacent to the furrow in which the seeds or seedlings are planted. Alternatively, the mixture may be deposited as droplets at approximately the same intervals at which each plant or seed is planted.

Immediately after the mixture is deposited it begins to oxidize into sulfur and phosphorus compounds which are available to plants growing in the soil. The complete transformation of the phosphorus into available compounds takes between about 1 to 30 days, depending on the particular soil and soil conditions. Based on observations, up to 80% of the sulfur may oxidize to sulfate in about 6 days. Complete sulfur oxidation requires several weeks under normal conditions.

Root systems of seedlings planted adjacent to freshly deposited mixtures were observed to grow around the mixture for several days; but, thereafter the systems grew directly through the zone of placement.

The normally liquid mixtures which are used in the methods of this invention comprise about 60 to 90 atom percent phosphorus and about 10 to 40 atom percent sulfur. Such combinations melt in the range of about 10 to 35° C. Preferred mixtures comprise about 70 to 80 atom percent phosphorus and about 20 to 30 atom percent sulfur. The phosphorus-sulfur eutectic, which comprises about 74 atom percent phosphorus and 26 atom percent sulfur, is particularly preferred.

Aside from phosphorus and sulfur, the mixtures used in this invention may contain other ingredients which do not effect a phase transition, i.e., the mixture remains flowable above about 10° C., and do not alter deleteriously the nutrient effect of the mixture. Such ingredients may include other plant nutrients including salts of Zn, Fe, Mn, Cu, B, Co and other minor elements needed by plants, pesticides, diluents and other nutrient sources such as potassium salts and rock phosphate.

The above described mixtures may be prepared by mixing elemental white phosphorus with sulfur in the desired proportions in an oxygen-free environment. For instance, sulfur may be added to phosphorus under water or oil in a vessel with stirring or other type of mixing. These mixtures are yellow liquids of moderate viscosity at temperatures above about 10° C.

These mixtures should be kept at temperatures below 70° C. in an oxygen-free environment until they are applied to soil. In this respect, they may be stored similarly to elemental yellow or white phosphorus, i.e., under water or oil.

Using these mixtures in accordance with this invention affords significant economical and logistical advantages over using conventional phosphorus and sulfur fertilizers. Firstly, these mixtures yield more phosphorus per pound than the presently used phosphorus fertilizers yield. Consequently, less pounds of material need to be handled and transported with this invention. The table below shows a quantitative comparison of the relative amounts of material needed to supply 100 lbs. of $P_2O_5$/acre.

POUNDS OF MATERIAL EQUIVALENT TO 100 LBS. $P_2O_5$/ACRE

| | |
|---|---|
| 100% $H_3PO_4$ | 138 |
| $H_3PO_4$ (54% $P_2O_5$) | 185 |
| 18–46–0 | 217 |
| P–S eutectic | 58.1 |

Thus, much smaller amounts of material are required to provide sufficient phosphorus to the soil according to the method of this invention. Another advantage gained by using these mixtures is that equipment and investment required to convert natural sources of phosphorus and sulfur into plant-available compounds is minimized. In accordance with this invention devices to blend and apply the elemental phosphorus and sulfur are the only equipment needed. The conversion of the mixtures to plant-available compounds occurs in the soil as described above.

The basic apparatus for applying liquid mixtures of phosphorus and sulfur comprises a container for holding the mixture and means operably connected to the container for removing the mixture by pumping or gravity flow from the container and injecting the mixture into the soil at the desired depth. The removal means will usually be connected to the bottom of the container. If the mixture is to be applied at temperatures below the mixture's freezing point the container will be equipped with suitable heating means. A preferred heating means consists of a jacket around the outer periphery of the container which is connected to a heated fluid source. Thus, a heated fluid, such as water or oil may be circulated through the jacket to keep the mixture's temperature above its freezing point.

As is customary in handling phosphorus solutions, the phosphorus sulfur mixture in the container will be covered with a layer of water or other suitable liquid to prevent oxidation. The container itself also will be covered. For use in the field the above-described apparatus may be mounted on a vehicle, e.g., a tractor. The heated fluid source in such an instance could be the vehicle's radiator or the hot gases from its exhaust system might be used.

The container may be coupled to the removal means by a valve which regulates the flow of the mixture out of the container. The removal means may be one or more plastic tubes. These tubes may end in metal shanks or blades similar to those used presently for injecting ammonia into soil. These shanks or blades cut through the soil to the desired depth for depositing the mixture. Accordingly the mixture flows out of orifices positioned at or near the bottom of these shanks to a depth of about 1 to 10 inches below the soil surface. In cold weather, these shanks or blades must also be heated to keep the mixture flowable. As the shanks or blades move through the soil the trailing soil falls and covers over the deposited mixture. The void spaces in the soil are sufficient to permit oxidation and hydration of the deposited droplets. Oxidation may be promoted by positioning a hot wire at the end of the shank to initiate oxidation of the mixture as it is being deposited in the soil.

EXAMPLES

The following examples illustrate the method of this invention. They are in no manner intended to limit the invention described herein. Unless indicated otherwise, percentages are by weight.

Example 1

One hundred-fifty grams of moist sand and 1.5 g. of field soil (<32 mesh) were mixed and placed in jars. Forty mg. of phosphorus in the form of a liquid mixture of elemental white phosphorus and elemental sulfur (74 atom percent phosphorus, 26 atom percent sulfur) was placed at a depth of 4 cm. in each jar. (Sand-soil mix was removed, a depression formed at the proper depth. The mixture was then added and immediately covered by returning the sand-soil mix to the jar.) These treated jars were incubated (in the laboratory) at ambient temperature.

After 3, 6, 12, 24 and 48 days, respectively, three replicate jars were sampled for $NaHCO_3$-soluble phosphate. The mixture in each jar was mixed thoroughly, oven dried, and a 5 g. sample extracted with 0.5 M aqueous $NaHCO_3$ solution for determination of available phosphate following procedures established by Olsen et al.[1] Untreated check sand-soil mixtures were extracted for comparison. Results, reported as the average of 3 replicates, appear in Table I.

In order to illustrate the combination of the mixture with other phosphorus sources, replicate jars of sand-soil mixture were also treated with the mixture described above and 133 mg. of rock phosphate. The mixture and powdered rock phosphate were placed together in the sand-soil mixture and allowed to incubate. $NaHCO_3$-soluble phosphorus was extracted from these treatments at various times as described above. These results also appear in Table I.

TABLE I.—AVAILABLE PHOSPHATE IN SAND-SOIL MIXTURE AFTER INCUBATION

| Phosphorus additive | P.p.m. $NaHCO_3$-Soluble P in sand-soil mix, days incubation | | | | |
|---|---|---|---|---|---|
| | 3 | 6 | 12 | 24 | 48 |
| Phosphorus-sulfur mixture | 105 | 98.6 | 70.0 | 63.5 | 57.7 |
| Phosphorus-sulfur mixture plus rock phosphate | 108 | 94.1 | 74.0 | 64.2 | 58.8 |
| Check | 2 | 4.7 | 3.3 | 4.2 | 3.8 |

The results reported in Table I evidence that the method of this invention may be used to supply substantial quantities of plant-available phosphorus to soil in a relatively short time period.

Example 2

Phosphorus-sulfur mixture (74 atom percent phosphorus, 26 atom percent sulfur) in an amount equivalent to 50 p.p.m. phosphorus and 17 p.p.m. sulfur in soil was placed 10 cm. below the soil surface in pots containing 1710 g. Sutherlin soil. Each pot was fertilized with 0.372 g. urea and 0.422 g. $KNO_3$ (equivalent to 136 p.p.m. N and 100 p.p.m. K in soil). Pots were incubated under greenhouse conditions for 3 weeks. A tomato seedling was then transplanted into each pot. The plants were grown for 55 days in the greenhouse, harvested and the dry weight of plant tissue was then determined. For comparison, tomato plants were also grown in pots of soil fertilized with elemental white phosphorus, phosphoric acid ($H_3PO_4$), and check soil. All pots were fertilized equally with urea and $KNO_3$. The average weights of the plants grown in each treatment are shown in Table II.

As a further measure of the fertilizer value of the mixture, the phosphorus and sulfur contents of tissue are determined. Leaf, stem and root tissues from each plant were wet-ashed with a mixture of nitric and perchloric acids. Phosphorus in the ash solution was determined colorimetrically by ammonium molybdate procedures.[2] Sulfur was measured turbidimetrically as a barium sulfate precipitate stabilized with a nonionic surfactant.[3] Total phosphorus uptake in leaf, stem and root tissue is shown in Table III as the average of 5 replicate plants.

Sulfur content of the above-ground tissue is shown in Table IV, again as the average of 5 replicate plants. The fact that the mixture supplied sulfur to the plants is evident by the 21 mg. sulfur in above-ground tissue of plants fertilized with the mixture compared to 9.0 and 8.5 mg. sulfur in plants in the white phosphorus and $H_3PO_4$ treatments, respectively.

Following harvest of the first crop of tomato plants, the soil in each pot was refertilized with 136 p.p.m. nitrogen and 100 p.p.m. potassium (from urea and $KNO_3$). No additional phosphorus or sulfur was applied. A second crop of tomato seedlings was then planted and grown in the greenhouse for 49 days. During growth of the second crop symptoms of sulfur deficiency (i.e., yellow color, reduced growth, brittle tissue) developed on plants on the white phosphorus and $H_3PO_4$ treatments, but not on plants fertilized with the mixture. At harvest, plants were cut about 1 in. above the soil surface and the dry weight of the above-ground plant was determined. Results are shown in Table V.

Superior growth of plants grown on soil fertilized with the liquid phosphorus-sulfur mixture prior to the first crop is evident.

---

[1] Olsen, S. R., Cole, C. V., Watanabe, F. S., and Dean, L. A., 1954. Estimation of Available Phosphorus in Soils by Extraction With Sodium Bicarbonate, U.S. Dept. Agr. Circ. 939.

[2] Johnson, C. M., and Ulrich, A. (1959), Analytical Methods for Use in Plant Analysis, Calif. Agr. Exp. Sta. Bul. 766.

[3] Garrido, M. L. (1964), Determination of Sulfur in Plant Material, Analyst 89:61–66.

TABLE II.—DRY WEIGHT OF TOMATO PLANTS IN RESPONSE TO PHOSPHORUS AND SULFUR FERTILIZATION—(FIRST CROP).

[Average of 5 replicate plants]

| Soil additive | g./plant | | | |
|---|---|---|---|---|
| | Leaves | Stems | Roots | Total |
| Phosphorus-sulfur mixture | 5.77 | 1.49 | 0.53 | 7.79 |
| White phosphorus | 5.66 | 1.72 | 0.56 | 7.94 |
| $H_3PO_4$ | 6.56 | 2.11 | 0.68 | 9.35 |
| Check | *0.27 | | 0.05 | 0.32 |

* Stems and leaves not separated due to small size of plants.

TABLE III.—PHOSPHORUS UPTAKE BY TOMATO PLANTS IN RESPONSE TO PHOSPHORUS AND SULFUR FERTILIZATION (1ST CROP)

[Average of 5 replicate plants]

| Soil additive | Mg. P/plant | | | |
|---|---|---|---|---|
| | Leaves | Stems | Roots | Total |
| Phosphorus-sulfur mixture | 9.58 | 2.33 | 1.02 | 12.98 |
| $P_4$ | 11.46 | 4.09 | 1.33 | 16.88 |
| $H_3PO_4$ | 12.55 | 5.23 | 1.52 | 19.30 |
| Check | *0.29 | | 0.08 | 0.37 |

* Leaves and stems not separated.

TABLE IV.—SULFUR UPTAKE BY TOMATO PLANTS* IN RESPONSE TO PHOSPHORUS AND SULFUR FERTILIZATION (1ST CROP)

[Average of 5 replicate plants]

| | Mg. Sulfur | | |
|---|---|---|---|
| | Leaves | Stems | Total** |
| Soil additive: | | | |
| Phosphorus-sulfur mixture | 19.0 | 2.0 | 21.0 |
| $P_4$ | 8.4 | 0.6 | 9.0 |
| $H_3PO_4$ | 7.9 | 0.6 | 8.5 |
| Check | *1.5 | | 1.5 |

* Leaves and stems not separated.
** Above-ground portion (leaves and stems).

TABLE V

Dry weight of tomato plants in response to phosphorus and sulfur fertilization (second crop), average of 5 replicate plants

| Soil additive: | Gm./plant[1] |
|---|---|
| Phosphorus-sulfur mixture | 4.33 |
| $P_4$ | 2.47 |
| $H_3PO_4$ | 2.19 |
| Check | 0.24 |

[1] Above-ground portion (leaves and stems).

Example 3

Recognizing that plants utilize sulfur in the sulfate ($SO_4^=$) form, the rapid response of plants to elemental sulfur when applied to the soil as phosphorus-sulfur solution as shown in Example 2 led to investigations of the rate of sulfur oxidation.

Small quantities of the liquid phosphorus-sulfur mixture of Example 1 were placed into 20 g. of sand in open vials (10 mg. sulfur and ca. 29 mg. phosphorus per vial). After 4, 12 and 36 days incubation at room temperature, the sulfate-sulfur was determined. The sand in each vial was extracted with 25 ml. of ammonium acetate-acetic acid solution[4] and $SO_4$-S in a 15 ml. aliquot of each extract was determined colorimetrically by the barium chloranilate method.[5] For comparison vials containing the same amount of sulfur and a pellet of white phosphorus not in direct contact with the sulfur; vials containing the same amount of sulfur in the form of flowers of sulfur and vials treated only with phosphorus were incubated and extracted as above. Results are presented in Table VI.

TABLE VI.—SULFATE SULFUR FOUND AFTER INCUBATION IN SAND AT ROOM TEMPERATURE

| Treatment P and S Applied [a] | Mg. $SO_4$-S per vial,[b] incubation period | | |
|---|---|---|---|
| | 4 days | 12 days | 36 days |
| $P_4$-$S_8$ Eutectic | 4.39 | 4.02 | 3.22 |
| $P_4$+$S_8$ (separate) [a] | | | 0.07 |
| $S_8$ [c] | | 0.03 | 0.47 |
| $P_4$ | | | 0.16 |
| Check | | | 0.04 |

[a] 10 mg. sulfur per vial.
[b] Average 3 replicate treatments.
[c] Flowers of sulfur mixed with sand.

These results confirm that sulfur oxidized rapidly from the phosphorus-sulfur mixture. This very rapid oxidation of sulfur to sulfate is postulated to be a chemical auto-oxidation in contrast to the slower biological oxidation reported to be responsible for most sulfur oxidation in soil. Some auto-oxidation of sulfur is known to occur in soils, but this discovery that sulfur oxidizes rapidly in the phosphorus-sulfur mixture is surprising and unexpected.

---

[4] Bardsley, C. E., and Lancaster, J. D., 1960, Determination of Reserve Sulfur and Soluble Sulfates in Soil, Soil Sci. Soc. Am. Proc., 24:265-268.

[5] Bertolacini, R. J., and Barney, J. E. II, 1957, Colorimetric Determination of Sulfate With Barium Chloranilate, Anal. Chem., 29:28-283.

What is claimed is:

1. A method for supplying phosphorus and sulfur to plants growing in soil which comprises applying a normally liquid mixture of yellow phosphorus and elemental sulfur to the soil.

2. The method of claim 1 wherein the normally liquid mixture of phosphorus and sulfur is applied to the soil at a depth of about 1 to 10 inches at quantities in the range between about 5 and 120 pounds per acre.

3. The method of claim 1 wherein the normally liquid mixture of phosphorus and sulfur comprises about 60 to 90 atom percent phosphorus and about 10 to 40 atom percent sulfur.

4. The method of claim 1 wherein the normally liquid mixture of phosphorus and sulfur comprises about 70 to 80 atom percent phosphorus and about 20 to 30 atom percent sulfur.

5. The method of claim 1 wherein the normally liquid mixture of phosphorus and sulfur comprises about 74 atom percent phosphorus and 26 atom percent sulfur.

References Cited

UNITED STATES PATENTS 3,343,939   9/1967   Larson et al. _____ 71—32

REUBEN FRIEDMAN, Primary Examiner

R. BARNES, Assistant Examiner